(No Model.)
T. WARWICK.
VEHICLE WHEEL.
No. 289,733. Patented Dec. 4, 1883.
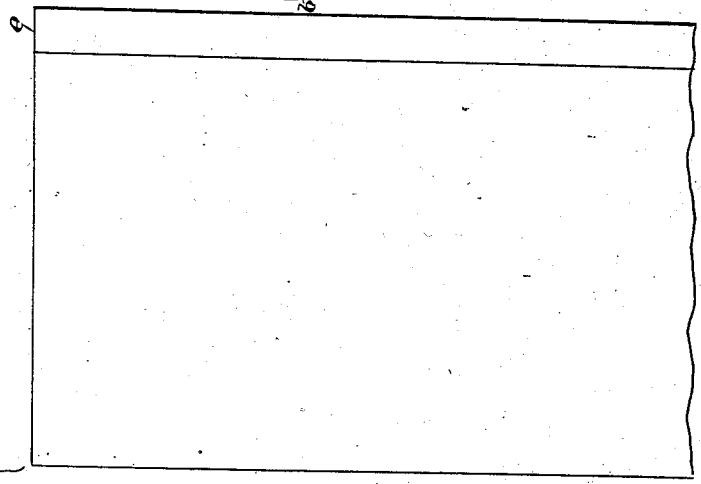
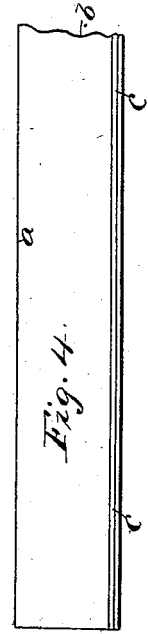
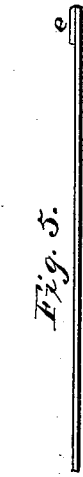
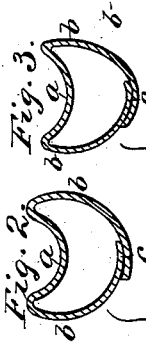
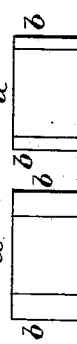
WITNESSES
Chas. R. Burr
W. E. Bowen
INVENTOR
Thos. Warwick
by
Wm H Babcock
Attorney

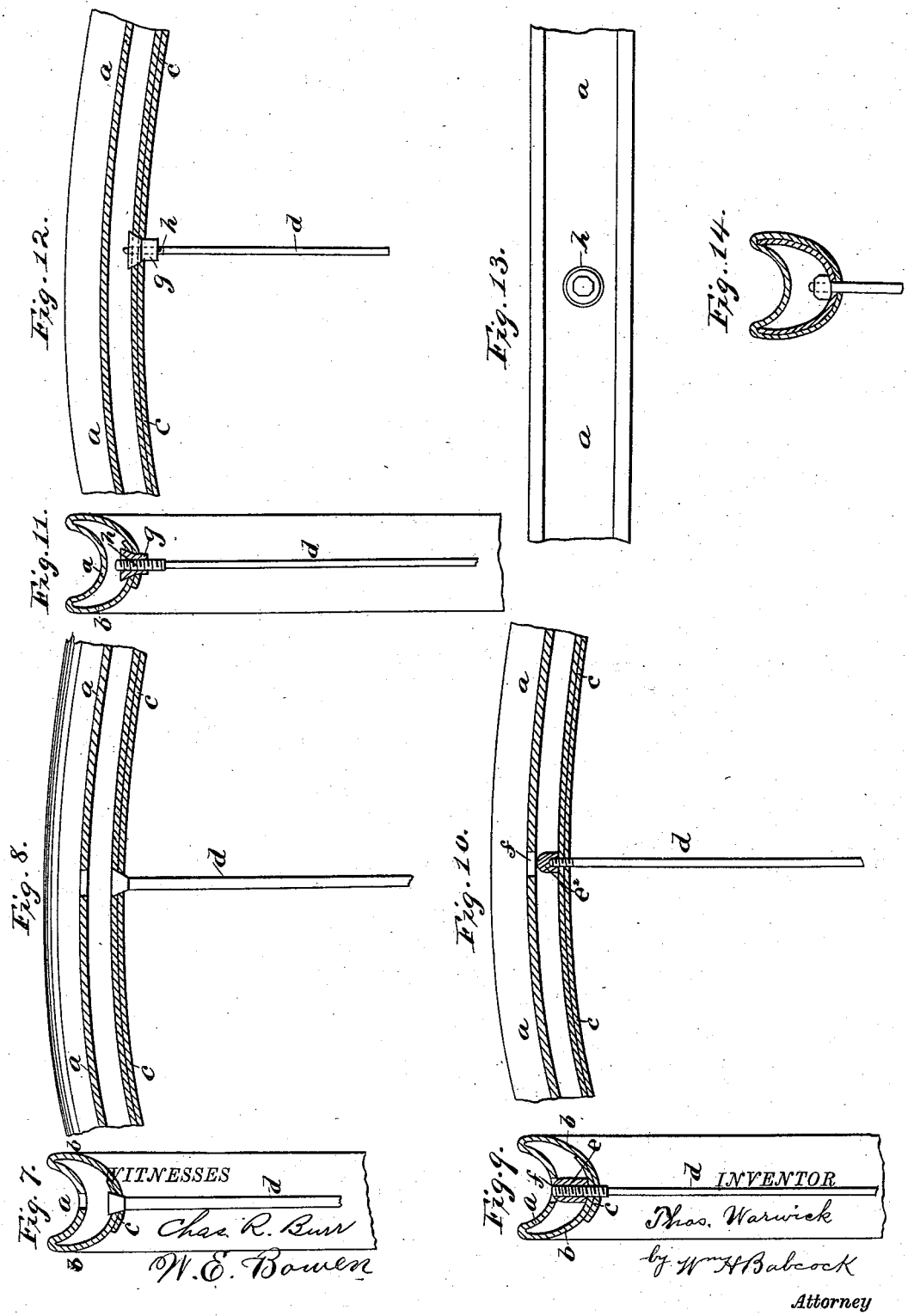

United States Patent Office.

THOMAS WARWICK, OF ASTON, NEAR BIRMINGHAM, COUNTY OF WARWICK, ENGLAND.

VEHICLE-WHEEL.

SPECIFICATION forming part of Letters Patent No. 289,733, dated December 4, 1883.

Application filed June 11, 1883. (No model.) Patented in England September 27, 1882, No. 4,597.

*To all whom it may concern:*

Be it known that I, THOMAS WARWICK, of Aston, near Birmingham, in the county of Warwick, England, manufacturer, have invented new and useful Improvements in Bicycles, Tricycles, and other Vehicles, (for which I have obtained a patent in Great Britain, No. 4,597, bearing date September 27, 1882,) of which the following is a specification, reference being had to the accompanying drawings.

My invention consists of the following improvement in making the metallic rims of the wheels of bicycles, tricycles, and other vehicles:

In making a rim according to my invention, I take a strip or strips of sheet-steel, and by drawing or rolling I give the said strip or strips the following general figure in cross-section: The middle of the strip is fashioned into a semicircular figure, and constitutes the trough in which the india-rubber ring or tire fits, and the sides of the strip or strips are folded and bent downward and beneath the said semicircular middle part, so as to give the said sides a nearly semi-elliptical figure, the edges of the sides overlapping and being brazed or soldered together. The strip of steel thus fashioned by drawing or rolling has at one side a semicircular figure and at the opposite side a nearly semi-elliptical figure, the overlapping or double soldered edges of the strip giving great strength and rigidity to it at the part where the spokes are to be connected. The rolled or fashioned strips of sheet-steel are bent into a circular figure to form the rims in any convenint manner.

I will now describe, with reference to the accompanying drawings, the manner in which my invention is to be performed.

In making a metallic rim for the wheels of bicycles and other vehicles, I take a strip or strips of sheet-steel of the kind represented in Figure 1, and by means of a drawing process effected by the use of a properly-shaped die or draw-hole fixed in a draw-bench I give to the said strip the form represented in cross-section and plan in Fig. 2—that is to say, by the action of the drawing-die or draw-hole the middle of the strip, Fig. I, is fashioned into a nearly semicircular figure in cross-section, (marked $a$, Fig. 2,) and constitutes the trough in which the india-rubber ring or tire fits, and the sides of the said strip, Fig. 1, are folded and bent downward and beneath the middle trough part, $a$, so as to give the sides nearly semi-elliptical figure in cross-section, as represented at $b$ $b$, Fig. 2, the edges of the said sides $b$ $b$ being made to overlap at $c$, as seen in the section of Fig. 2. The overlapping edges $c$ of the shaped or fashioned tube, Fig. 2, are next brazed or soldered together in the way commonly practiced in brazing or soldering the edges of ordinary tubes. The brazed or soldered tube having the sectional form represented in Fig. 2 is next subjected to a second drawing operation with a second die or draw-hole, so as to give the said tube, Fig. 2, the form represented in cross-section and plan in Fig. 3, and longitudinal section in Fig. 4. By the last-described drawing operation the sides $b$ $b$ of the nearly semi-elliptical part of the tube are flattened and slightly contracted, and the nearly semicircular part or trough $a$ is expanded. By this construction the overlapping brazed or soldered edges $c$ give great strength and rigidity to the rim formed therefrom at the part where the spokes are to be connected to it. Additional strength may be given to the overlapping part of the tube from which the rim is to be made by folding or doubling one edge of the strip before the drawing operation, as represented at $e$, Fig. 5. After the drawing operation the folded or doubled edge $e$ of the strip is situated within the semi-elliptical part $b$ $b$ of the tube, as represented in the cross-section, Fig. 6, so that there are three thicknesses of metal at the overlapping junction of the rim-tube. The folded or doubled edge $e$ may be situated outside instead of inside the rim. The brazed or soldered tube thus made is bent into a circular figure to form the rim in any convenient way.

Although I prefer to shape or fashion the hollow rim by drawing strips of sheet-steel, yet the said rim may be fashioned by rolling or by the combined process of rolling and drawing. I prefer to connect the metallic spokes to the overlapping and strengthened part $c$ of the rim in the ways hereinafter described; but other ways may be employed. In the arrangement shown in cross-section in Fig. 7, and longitudinal section in Fig. 8, the ordinary headed spoke, d, is used, a hole being made through the bottom of the trough part a, for the passage of the head of the spoke, and a second hole is made through the overlapping edges c for the said head to seat itself in, the other end of the spoke being screwed into the hub of the wheel. In the arrangement shown in cross-section in Fig. 9, and longitudinal section in Fig. 10, the outer end of the spoke d is screwed and is fixed in its place in the rim by the screw-nut $e^2$, seating itself upon the overlapping edges c of the rim, the said screw-nut $e^2$ being turned by a spanner or key introduced through the large hole f in the bottom of the trough a. In the arrangement shown in cross-section in Fig. 11, longitudinal section in Fig. 12, and plan of upper side in Fig. 13, a screw-nut, g, having a collar or extension, h, seats itself in the hole in the overlapping edges c of the rim, the angular part of the screw-nut g projecting below the said hole, so that the spoke can be adjusted from the outside of the rim. This arrangement permits the spokes being tightened when required without removing the india-rubber ring or tire from the trough a.

Although I have only described lapped joints, it will be understood that what is known as "butt-joints" may be used to advantage in some cases, and the inner plate of the butt-joint may, according to my invention, be of any desired width.

What I claim is—

In a wheel for bicycles, tricycles, and similar vehicles, a tire consisting of a single piece of metal having its outer face concave and its edges bent backward to overlap and form a convex inner face, in combination with spokes which pass through said overlapping edges and are fastened thereto by nuts, substantially as set forth.

In testimony whereof I have hereunto signed name in the presence of two subscribing witnesses.

THOMAS WARWICK.

Witnesses:
T. EMERY DAVIES,
   11 *Old Square, Birmingham.*
CHARLES W. H. JOHNSTONE,
   *Clerk to the said T. E. Davies.*